(12) United States Patent
Emori

(10) Patent No.: US 8,909,518 B2
(45) Date of Patent: Dec. 9, 2014

(54) FREQUENCY AXIS WARPING FACTOR ESTIMATION APPARATUS, SYSTEM, METHOD AND PROGRAM

(75) Inventor: Tadashi Emori, Tokyo (JP)

(73) Assignee: NEC Corporation, Tokyo (JP)

( * ) Notice: Subject to any disclaimer, the term of this patent is extended or adjusted under 35 U.S.C. 154(b) by 1215 days.

(21) Appl. No.: 12/679,818

(22) PCT Filed: Sep. 22, 2008

(86) PCT No.: PCT/JP2008/067125
§ 371 (c)(1),
(2), (4) Date: Mar. 24, 2010

(87) PCT Pub. No.: WO2009/041402
PCT Pub. Date: Apr. 2, 2009

(65) Prior Publication Data
US 2010/0204985 A1    Aug. 12, 2010

(30) Foreign Application Priority Data
Sep. 25, 2007    (JP) .................................. 2007-247572

(51) Int. Cl.
*G10L 11/06* (2006.01)
*G10L 15/02* (2006.01)
*G10L 13/033* (2013.01)
*G10L 25/24* (2013.01)
*G10L 25/78* (2013.01)

(52) U.S. Cl.
CPC .............. *G10L 15/02* (2013.01); *G10L 13/033* (2013.01); *G10L 25/24* (2013.01); *G10L 25/78* (2013.01)
USPC ............ 704/208; 704/240; 704/241; 704/256

(58) Field of Classification Search
CPC ......... G10L 15/12; G10L 15/14; G10L 25/78; G10L 25/93
USPC .................................. 704/208, 240, 241, 256
See application file for complete search history.

(56) References Cited

U.S. PATENT DOCUMENTS

| 6,006,175 | A  | * | 12/1999 | Holzrichter ................... 704/208 |
| 2006/0251130 | A1 | * | 11/2006 | Greer et al. .................... 370/508 |
| 2007/0185715 | A1 | * | 8/2007 | Wei et al. ....................... 704/254 |
| 2009/0030679 | A1 | * | 1/2009 | Chengalvarayan et al. .. 704/233 |
| 2010/0198590 | A1 | * | 8/2010 | Tackin et al. .................. 704/214 |

FOREIGN PATENT DOCUMENTS

| CN | 1494053 A | 5/2004 |
| CN | 1953050 A | 4/2007 |
| JP | 06-214596 A | 8/1994 |
| JP | 11-327592 A | 11/1999 |
| JP | 3632529 A | 3/2005 |

OTHER PUBLICATIONS

Chinese Office Action for CN200880108790.8 issued Sep. 15, 2011.
International Search Report for PCT/JP2008/067125, mailed Oct. 28, 2008.

(Continued)

*Primary Examiner* — Jakieda Jackson
(74) *Attorney, Agent, or Firm* — Sughrue Mion, PLLC

(57) ABSTRACT

A warping factor estimation system comprises label information generation unit that outputs voice/non-voice label information, warp model storage unit in which a probability model representing voice and non-voice occurrence probabilities is stored, and warp estimation unit that calculates a warping factor in the frequency axis direction using the probability model representing voice and non-voice occurrence probabilities, voice and non-voice labels, and a cepstrum.

20 Claims, 4 Drawing Sheets

(56) References Cited

OTHER PUBLICATIONS

K. Nakamura, "Identification of environmental noise and unnecessary utterance on a real information guidance system with spoken dialogue interface", IEICE Technical Report, Jan. 22, 2004, vol. 103, No. 632, pp. 13-18.

S. Young et al., "Creating Tied-State Triphones", The HTK Book (for HTK Version 3.3), 2005, pp. 35-40, 54-64 and 127-131.

* cited by examiner

FREQUENCY AXIS WARPING FACTOR ESTIMATION APPARATUS, SYSTEM, METHOD AND PROGRAM

The present application is the National Phase of PCT/JP2008/067125, filed on Sep. 22, 2008, which claims priority from Japanese Patent Application 2007-247572 (filed on Sep. 25, 2007) the content of which is hereby incorporated in its entirety by reference into this description.

TECHNICAL FIELD

The present invention relates to a speech processing technology, and more particularly to a warping factor estimation apparatus, a cepstrum transformation system, a speech recognition system, a waveform synthesis system, and methods and programs for the apparatus and systems for normalizing the speaker's voice individuality represented by warping on the frequency axis.

BACKGROUND ART

In the speech recognition field, methods for correcting a fluctuation in the resonant frequency of the spectrum, caused by a difference in the speaker's vocal tract length, are proposed for increasing the accuracy of recognition performance. Such a technology is called vocal tract normalization. An example of the vocal normalization method is disclosed, for example, in Patent Document 1 (Japanese patent No. 3632529) in which the degree of difference is efficiently estimated by modeling a difference in the resonant frequency using linear transformation in the cepstrum space.

The vocal tract normalization proposed in Patent Document 1 comprises an analysis unit that analyzes a voice and outputs a cepstrum, a warp estimation unit that estimates the value of the warping factor, which indicates a warping degree, from the cepstrum, and a transformation unit that linearly transforms the cepstrum using the value of the warping factor.

The linear transformation used in the transformation unit represents the transformation on the frequency axis as the linear transformation of the cepstrum by using the inverse transformation of a all-pass filter. This transformation uses one parameter.

In Patent Document 1, the HMM (Hidden Markov Model) used for recognition is used to estimate a warping factor. As described in Patent Document 1, the HMM used for recognition is a model in which the output probability of phonological information is modeled on a word or phoneme basis.

For example, "hai" is divided into phonemes "h a i" and the occurrence probability is modeled for each of h, a, and i. The occurrence probability in frequently-used modes is a normal distribution. In this case, the average and variance of the feature value, such as a cepstrum, are calculated for each phoneme in advance for use in recognition. In Patent Document 1, the following expression (1) is used for estimating the warping factor.

$$\alpha = \frac{\sum_{j=1}^{J}\sum_{t=1}^{T} \gamma_t(j) \left[ \sum_{m=1}^{M} \frac{(c_{mt}-\mu_{jm})\left\{\begin{array}{c}(m-1)c_{(m-1)t} - \\ (m+1)c_{(m+1)t}\end{array}\right\}}{\sigma_{mj}^2}\right]}{\sum_{j=1}^{J}\sum_{t=1}^{T} \gamma_t(j) \left[ \sum_{m=1}^{M} \frac{\{(m-1)c_{(m-1)t} - (m+1)c_{(m+1)t}\}^2}{\sigma_{mj}^2}\right]} \quad (1)$$

where, J and j indicate numbers of phonemes and states and IDs that identify the phoneme and state, t indicates the time, M and m indicate the number of cepstrum dimensions and the dimension, $c_{mt}$ indicates the mth-dimensional cepstrum coefficient at time t, and $\mu_{mj}$ and $\sigma_{mj}$ indicate the mth-dimensional average vector value and the mth-dimensional standard deviation value of the phoneme j in the HMM.

The estimation of a warping factor value using this expression requires information on identifying the average vector and the variance.

The ID information for identification may be calculated by giving word information that describes the content of a voice. That is, when "hai" is given in the example above, the phoneme string information such as "h a i" may be identified, the information may be further expanded into the state sequence of each of h, a, and i, and the probability distribution belonging to the state may be identified.

Patent Document 1:
  Japanese patent No. 3632529
Non-Patent Document 1:
  HTK Book Ver. 3.3, pp. 35-40, pp. 54-64, pp. 127-131

SUMMARY

The disclosure of Patent Document 1 and Non-Patent Document 1 given above is hereby incorporated by reference into this description. The following gives an analysis of the technology related to the present invention.

To obtain phoneme strings, it is possible to manually give the phoneme information if the speech content is known in advance.

On the other hand, if the speech content, as with a spoken language for example, cannot be not known in advance, it is not practical to manually give the phoneme information because the manual operation is costly. In such a case, speech recognition is once performed for the speech content in many cases to automatically obtain phoneme strings.

However, the speech recognition processing usually requires a relatively large amount of calculation. Therefore, in a limited amount of calculation, the execution of the speech recognition processing only for generating phoneme string information, which will be used for estimation, should be avoided.

In addition, the phoneme string information obtained via speech recognition includes errors, thereby degrading estimation accuracy.

In view of the foregoing, it is an object of the present invention to provide a warping factor estimation apparatus capable of estimating a warping factor during vocal tract normalization processing with a small amount of calculation, a cepstrum transformation system having the apparatus, a speech recognition system, a waveform synthesis system, a method therefore and a computer readable recording medium storing a program therefor.

It is another object of the present invention to provide a warping factor estimation apparatus capable of increasing the estimation accuracy of a warping factor indicating a difference in the vocal tract length, a cepstrum transformation system having the apparatus, a speech recognition system, a waveform synthesis system, a method therefore and a computer readable recording medium storing a program therefor.

The invention disclosed by this application has the following general configuration.

According to one aspect of the present invention, there is provided a warping factor estimation apparatus comprising: a label information generation unit that produces information on voice and non-voice labels; a warp model storage unit that stores a probability model representing voice and non-voice occurrence probabilities; and a warp estimation unit that calculates a warping factor in a frequency axis direction using the probability model representing voice and non-voice occurrence probabilities, the voice and non-voice labels, and a cepstrum.

According to another aspect of the present invention, there is provided a cepstrum transformation system comprising the warping factor estimation apparatus; and a transformation unit that transforms a cepstrum using a warping factor.

According to another aspect of the present invention, there is provided a speech recognition system comprising the cepstrum transformation system; an acoustic model storage unit that stores a probability model representing occurrence probabilities of phonological information on a phoneme basis; and a speech recognition unit that performs a speech recognition using the transformed cepstrum and the probability model representing occurrence probabilities of phonological information on a phoneme basis.

According to still another aspect of the present invention, there is provided a waveform synthesis system comprising a waveform synthesis unit that synthesizes waveforms using the cepstrum transformed by the cepstrum transformation system.

In still another aspect of the present invention, the speech recognition system may be configured such that the warp model storage unit includes a plurality of probability models, each representing voice and non-voice occurrence probabilities, and the warp estimation unit calculates a warping factor once for each of the models stored in the warp model storage unit, the speech recognition system further comprising:

a warping factor determination unit that determines a warping factor from the warping factors, calculated by the warp estimation unit, and outputs the determined warping factor along with model information corresponding to the warping factor;

a warping factor determination unit that determines a warping factor from the warping factors, calculated by the warp estimation unit, and model information; and an acoustic model switching unit that selects an acoustic model, stored in the acoustic model storage unit, based on the model information, and supplies the selected acoustic model to the speech recognition unit, wherein the transformation unit performs a cepstrum transformation using the warping factor determined by the warping factor determination unit.

According to the present invention, there is provided a warping factor estimation method wherein a probability model representing voice and non-voice occurrence probabilities is stored in a storage unit, the method comprising the steps of:

producing information on voice and non-voice labels; and calculating a warping factor in a frequency axis direction using the probability model representing voice and non-voice occurrence probabilities, the voice and non-voice labels, and a cepstrum.

According to the present invention, there is provided a cepstrum transformation method comprising the step of transforming a cepstrum using the warping factor calculated by the warping factor estimation method.

According to the present invention, there is provided a speech recognition method comprising the step of performing speech recognition using the cepstrum, transformed by the cepstrum transformation method, and a probability model representing occurrence probabilities of phonological information.

According to the present invention, there is provided a waveform synthesis method comprising the step of synthesizing waveforms using the cepstrum transformed by the cepstrum transformation method.

According to the present invention, there is provided a computer readable recording medium storing a warping factor estimation program wherein a probability model representing voice and non-voice occurrence probabilities is stored in a storage unit, the program causing a computer to execute:

a process that produces information on voice and non-voice labels; and a process that calculates a warping factor in a frequency axis direction using the probability model representing voice and non-voice occurrence probabilities, the voice and non-voice labels, and a cepstrum.

According to the present invention, there is provided a computer readable recording medium storing a cepstrum transformation program causing a computer to execute a process that transforms a cepstrum using a warping factor calculated by the warping factor estimation program.

According to the present invention, there is provided a computer readable recording medium storing a speech recognition program causing a computer to execute speech recognition using the cepstrum, transformed by the cepstrum transformation program, and a probability model representing occurrence probabilities of phonological information.

According to the present invention, there is provided a computer readable recording medium storing a waveform synthesis program causing a computer to synthesize waveforms using the cepstrum transformed by the cepstrum transformation program.

According to the present invention, by using an HMM, designed to represent speaker's global information, that is, a probability model that uses only two classes, voice and non-voice, it is possible to carry out the warping factor estimation with a smaller amount of calculation in vocal tract normalization processing.

According to the present invention, it is possible to increase the estimation accuracy of a warping factor that represents a difference in the vocal tract length.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

In the present invention, there is provided warping factor estimation apparatus (110) that comprises a label information generation unit (104) that outputs voice and non-voice label information, a warp model storage unit (107) in which a probability model representing voice and non-voice occurrence probabilities is stored, and a warp estimation unit (103) that calculates a warping factor in the frequency axis direction using the probability model representing voice and non-voice occurrence probabilities, voice and non-voice labels, and a cepstrum.

In the present invention, in estimating the warping factor of the frequency-axis warping function used for suppressing a fluctuation in the formant frequency generated due to a difference in an estimated speaker's vocal tract, there is used an HMM, designed to represent speaker's global information, that is, a probability model using only to two classes, voice and non-voice, to allow the warping factor to be estimated with a smaller amount of calculation.

In the present invention, there may be used only two classes, voice and non-voice, to eliminate the need for using uncertain phoneme information for the estimation. According to the present invention, the voice and non-voice phoneme information, which does not require processing such as speech recognition in advance, does not require any amount of calculation.

In estimating a difference in the vocal tract that is speaker's global information, the estimation on a rough basis such as voice and non-voice is considered better than the estimation by comparison on a detailed phoneme basis. In addition, the more detailed the given phoneme information is, the more the errors are introduced; in contrast, because voices and non-voices are clearly distinguished, the present invention allows the estimation to be made accurately without being affected by the given phoneme information.

Therefore, compared with the related art method, the method of the present invention can estimate the warping factor, which indicates a difference in the vocal tract, more accurately. The present invention will be described in detail below using exemplary embodiments.

Figure 1:
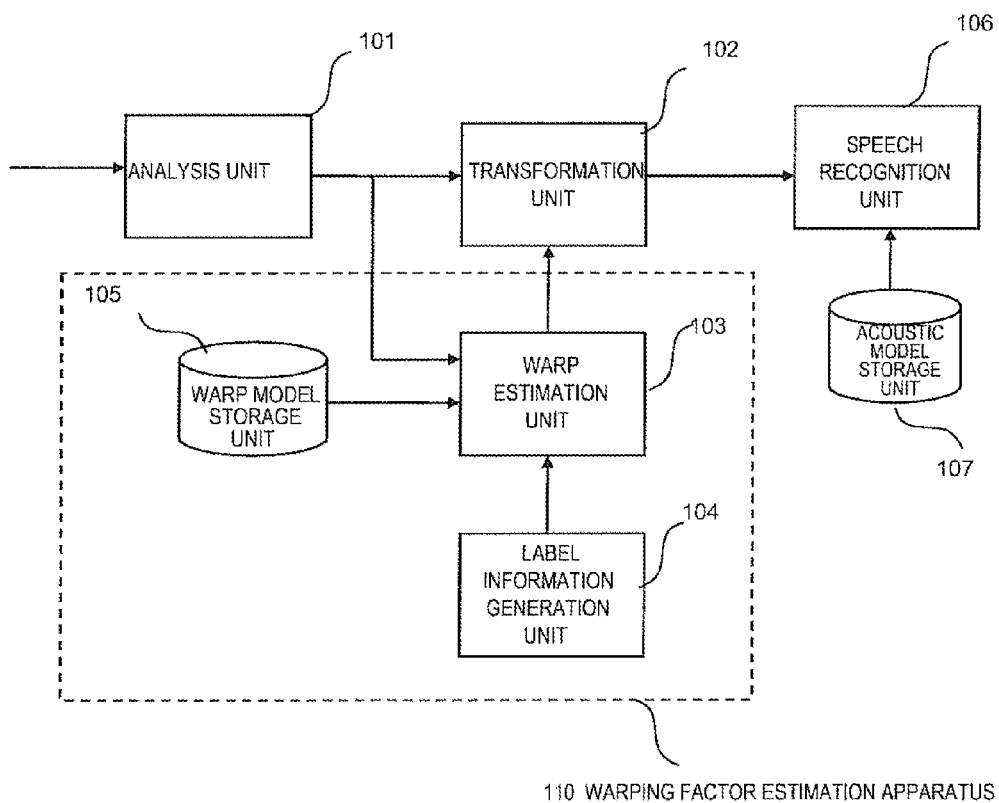
FIG. 1 is a block diagram showing the configuration of a first exemplary embodiment of the present invention.

FIG. 1 is a diagram showing the configuration of one exemplary embodiment of the present invention. A feature value transformation unit used for speech recognition will be described. Referring to FIG. 1, the apparatus according to the present exemplary embodiment comprises an analysis unit 101, a transformation unit 102, a warp estimation unit 103, a label information generation unit 104, a warp model storage unit 105, a speech recognition unit 106, and an acoustic model storage unit 107. A block that includes the warp estimation unit 103, label information generation unit 104, and warp model storage unit 105 forms a warping factor estimation apparatus 110.

Although not limited thereto, the analysis unit 101 extracts an input voice signal that has undergone A/D conversion at sampling frequency of 44.1 kHz with bit rates of 16 bits per sample, for a fixed period of about 10 msec, performs pre-emphasis, FFT (Fast Fourier Transform), and filter bank processing and, after that, outputs a mel-cepstrum calculated by carrying out the cosine transformation.

The acoustic model storage unit 107 stores HMM-represented acoustic models having triphones, which take the preceding and following phoneme contexts into consideration, as phonemes. Triphones are described, for example, in Non-Patent Document 1 (HTK Book Ver. 3.3, pp. 35-40) published by Cambridge University.

The warp model storage unit 105 uses an HMM that represents only two classes, voice and non-voice. This model is called a GMM (Gaussian Mixture Model) in order to distinguish it from the HMM stored in the acoustic model storage unit 107.

An HMM uses phonemes such as triphones that take phoneme contexts into consideration, whereas, unlike an HMM in which detailed phoneme classes are modeled, a GMM holds only two classes, in consideration of the characteristics of the vocal tract length normalization that performs correction based on the frequency-axis warping, for each speaker.

The learning of a GMM will now be described. First, the acoustic feature of a speech is determined by the cepstrum described above and by the power and the difference in preceding and following times such as those described in Non-Patent Document 1 (pp. 54-64).

Using label data obtained using the acoustic features and the corresponding written text, the feature and the label data are made to correspond to each other by calculating the forward and backward probabilities described in Non-Patent Document 1 (page 127 to page 130).

In this exemplary embodiment, two-class label information such as "sil voice sil" is used where "sil" indicates a non-voice and "voice" indicates a voice.

The parameters representing the distribution of the feature values for each corresponding label are calculated using the feature value and the label data that are made to be correspond.

A normal distribution is used in many cases as a function that represents the distribution. In this case, the parameters are a mean and a variance.

It is desired that voices used for GMM learning be voice data used for HMM learning, considering the HMM-based speech recognition that will be performed later.

The label information generation unit 104 generates and outputs label data "sil voice sil" in the same way as at learning time.

At this time, the correspondence may be established more accurately by changing the number of voice labels according to the length of the voice. It is supposed that longer voice data involves more voice intervals and so increasing the number of voice labels according to the length of the voice data has an effect of decreasing the probability at which an unwanted transition occurs.

The warp estimation unit 103 calculates the parameter value, which represents warping on the frequency axis, using expression (1) given above.

J in expression (1) indicates the number of classes that is 1 in this exemplary embodiment.

In expression (1), T indicates the number of feature values. In this case, T is the number calculated by dividing the voice length by the unit of the selected time.

$\gamma_t(i)$ indicate an occupation measure of the voice class at time t. This occupation measure value may be calculated by the forward/backward algorithm described above.

$C_{mt}$ that is the dimension number of the cepstrum coefficient is the value of the m-th dimensional cepstrum coefficient at time t.

$\mu_m$, indicates the m-th dimensional mean vector of the voice class, and $\sigma_{mj}$ indicates the m-dimensional standard deviation of the voice class.

The warping factor α, a warping parameter indicating the degree of warping of the frequency axis as in Patent Document 1, is a value calculated by the warp estimation unit 103.

The transformation unit 102 transforms the cepstrum using the warping factor α, calculated by the warp estimation unit 103, and outputs the transformed cepstrum. Cepstrum transformation is performed by expression (2) given below as in Patent Document 1.

$$\hat{c}_m^{(i)} = \begin{cases} c_{-i} + \alpha \hat{c}_0^{(i-1)}, & m = 0 \\ (1-\alpha^2)\hat{c}_{m-1}^{(i-1)} + \alpha \hat{c}_1^{(i-1)}, & m = 1 \\ \hat{c}_{m-1}^{(i-1)} + \alpha (\hat{c}_m^{(i-1)} - \hat{c}_{m-1}^{(i)}), & m \geq 2 \end{cases} \quad (2)$$

$$i = -\infty, \ldots, -1, 0.$$

where c with ^ indicates the transformed cepstrum.

The speech recognition unit 106 recognizes speech using the HMM with the cepstrum, transformed by the transformation unit 102, as the feature value.

As a modification of this exemplary embodiment, a waveform synthesis unit may also be provided for synthesizing the waveforms using the cepstrum transformed by the transformation unit 102. That is, the warp estimation unit 103 may applicable also to a voice synthesis apparatus.

It is of course possible to implement the functions of the analysis unit 101, transformation unit 102, warp estimation unit 103, and speech recognition unit 106 using a program executed on a computer (processor or digital signal processor). According to the present invention, there is provided a computer readable recording medium storing the program.

Figure 2:
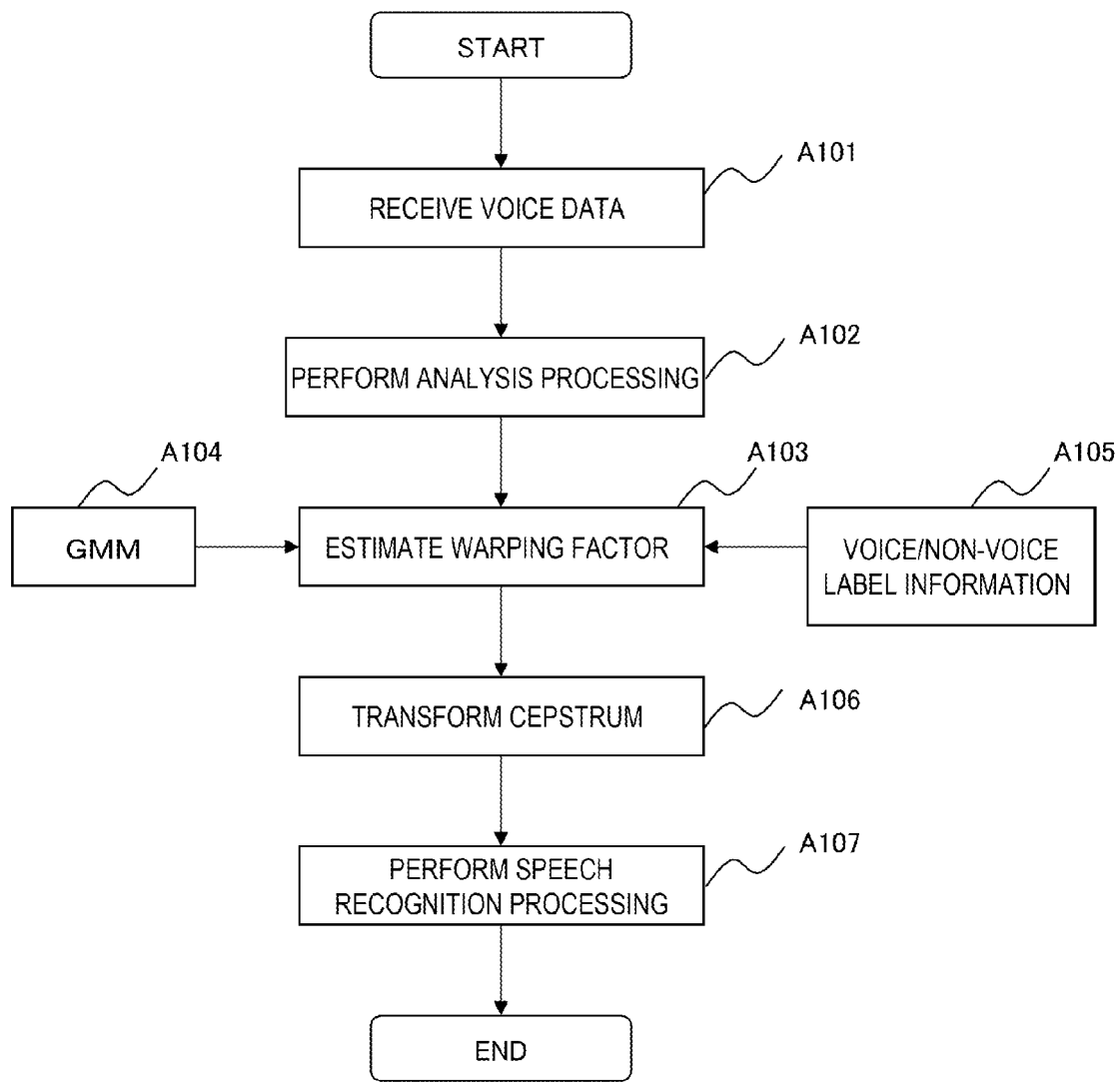
FIG. 2 is a flowchart showing the operation of the first exemplary embodiment of the present invention.

FIG. 2 is a flowchart showing the processing of the first exemplary embodiment of the present invention. The general operation of the first exemplary embodiment of the present invention will now be described in detail with reference to FIG. 1 and FIG. 2. First, a voice data signal is received (step A101 in FIG. 2), and the analysis unit 101 performs the calculation of the mel-cepstrum (step A102).

The warp estimation unit 103 calculates warping parameters using the mel-cepstrum output from the analysis unit 101, the GMM (A104) in the warp model storage unit 105, and the voice/non-voice label information (A105) from the label information generation unit 104 (step A103).

The transformation unit 102 uses one of the transformation functions in expression (2) to transform the cepstrum using the warping factor α and outputs the transformed cepstrum (step A106).

The speech recognition unit 106 recognizes the speech using the HMM, stored in the acoustic model storage unit 107, with the cepstrum, transformed by the transformation unit 102, as the feature value (step A107).

Figure 3:
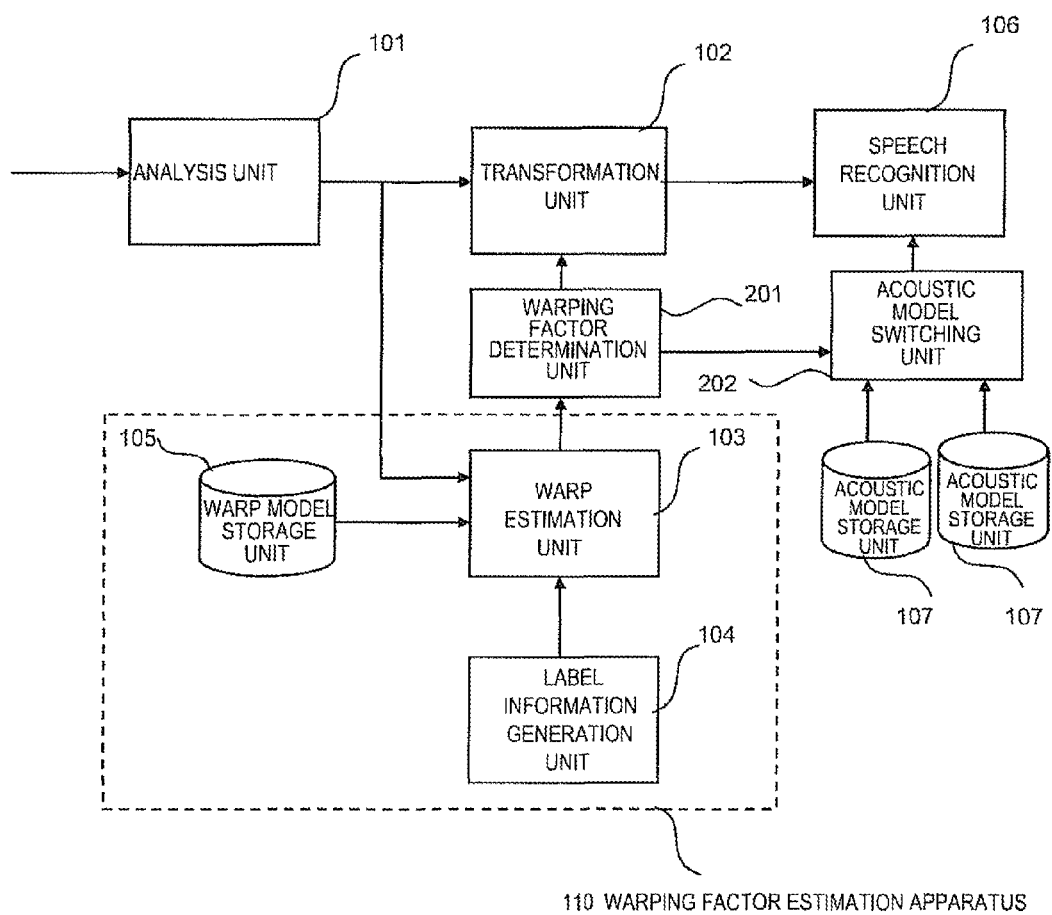
FIG. 3 is a block diagram showing the configuration of a second exemplary embodiment of the present invention.

FIG. 3 is a diagram showing the configuration of a second exemplary embodiment of the present invention. In addition to the configuration of the first exemplary embodiment described above, this exemplary embodiment further comprises a warping factor determination unit 201 and an acoustic model switching unit 202.

A warp model storage unit 105 stores a plurality of models each similar to the GMM described in the first exemplary embodiment. Note that the plurality of GMMs differ in voice data that was learned. For example, the plurality of GMMs includes two GMMs, one for men and the other for women, or GMMs each for learned data on one speaker.

A warp estimation unit 103 calculates the warping factor (warping parameter) α in the same was as in the first exemplary embodiment.

In this exemplary embodiment, the warp estimation operation of the warp estimation unit 103 is repeated multiple times, and the warping parameter is calculated once for each of GMMs stored in the warp model storage unit 105. To calculate the warping parameter, the calculation of the forward/backward probability is also repeated multiple times.

The warping factor determination unit 201 selects the highest of the forward/backward probabilities calculated for the GMMs by the warp estimation unit 103 and outputs the GMM information and the value of the warping parameter α.

The GMM information refers to the information on the selected GMM. For example, when multiple GMMs are provided, one for men and the other for women, the warping factor determination unit 201 outputs the information on one of men or women.

When GMMs are prepared, one for each speaker, the warping factor determination unit 201 outputs a speaker name. The acoustic model switching unit 202 selects an HMM from the acoustic model storage unit 107, based on the GMM information output by the warping factor determination unit 201, and outputs the selected HMM.

Figure 4:
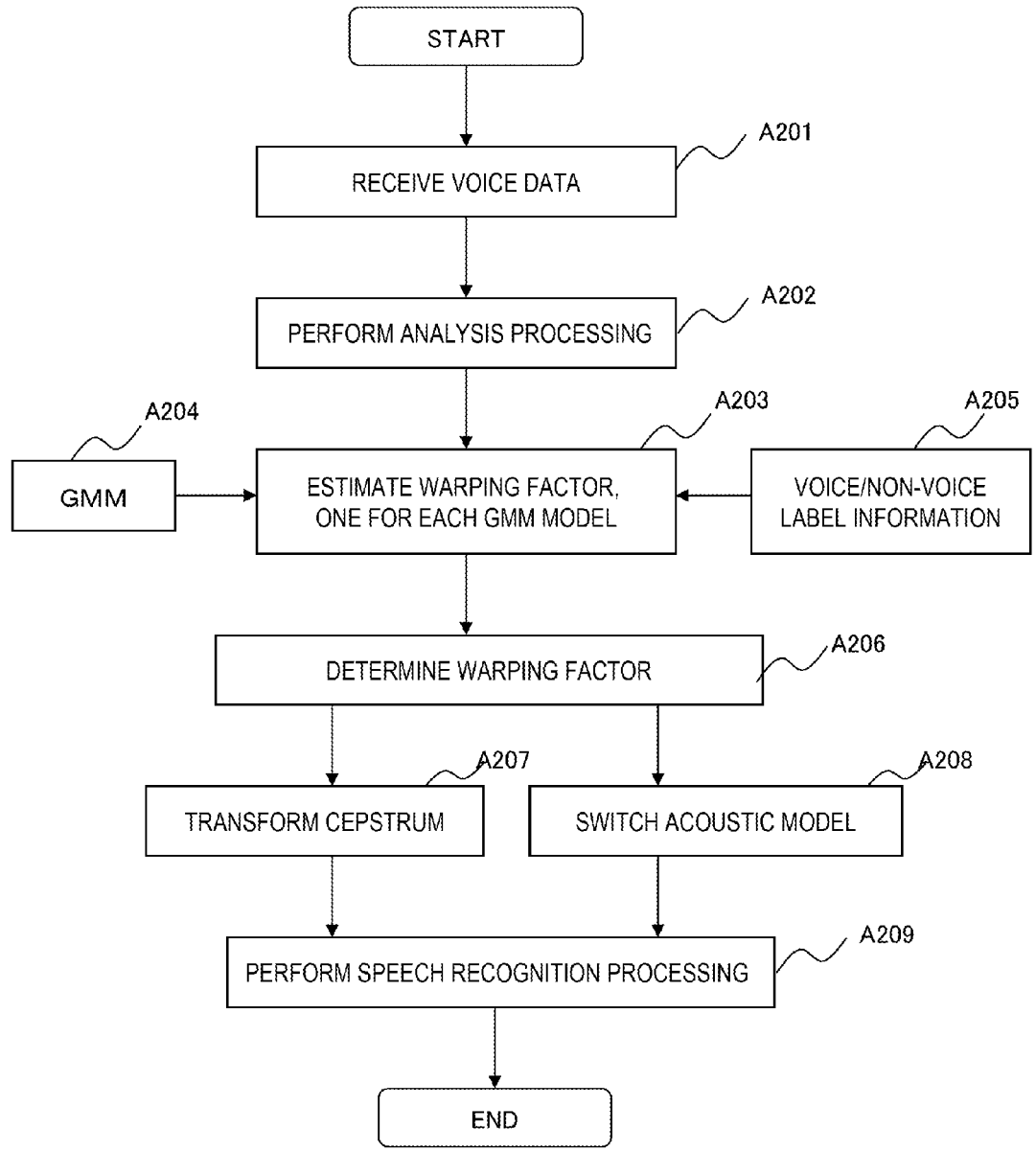
FIG. 4 is a flowchart showing the operation of the second exemplary embodiment of the present invention.

FIG. 4 is a flowchart showing the processing of the second exemplary embodiment of the present invention. The general operation of the second exemplary embodiment of the present invention will now be described in detail with reference to FIG. 3 and FIG. 4. First, a voice data signal is received (step A201 in FIG. 4) and the analysis unit 101 performs the calculation of mel-cepstrum (step A202).

Using the pattern (mel-cepstrum) output from the analysis unit 101 and the voice/non-voice label information (A205) received from the label information generation unit 104, the warp estimation unit 103 calculate the warping parameter once for each of GMMs (A204) stored in the warp model storage unit 105 (step A203).

The warping factor determination unit 201 outputs the selected GMM information and the value of the warping factor (warping parameter) a (A206).

The transformation unit 102 uses one of transformation functions in expression (2), transforms the cepstrum using the warping factor α, and outputs the transformed cepstrum (step A207).

The acoustic model switching unit 202 selects an HMM from the acoustic model storage unit 107 based on the GMM information output by the warping factor determination unit 201 (step A208).

Speech recognition unit 106 recognizes the speech using the HMM, stored in acoustic model storage unit 107, with the cepstrum, transformed by the transformation unit 102, as the feature value (step A209).

This exemplary embodiment has the configuration described above to allow a model for a specific speaker to be selected and the warping parameter to be estimated at the same time.

As a modification of this exemplary embodiment, waveform synthesis unit may also be provided for synthesizing the waveforms using the cepstrum transformed by the transformation unit 102. That is, this warp estimation unit 103 may applicable also to a voice synthesis apparatus.

In this exemplary embodiment, it is of course possible to implement the functions of the analysis unit 101, transformation unit 102, warp estimation unit 103, speech recognition unit 106, warping factor determination unit 201, and acoustic model switching unit 202 using a program executed on a computer (processor or digital signal processor). According to the present invention, there is provided a computer readable recording medium storing the program.

INDUSTRIAL APPLICABILITY

The present invention is applicable to a speech recognition apparatus that recognizes a speech and to a program that implements a speech recognition apparatus on a computer.

The exemplary embodiments and the examples may be changed and adjusted in the scope of the entire disclosure (including claims) of the present invention and based on the basic technological concept. In the scope of the claims of the present invention, various disclosed elements may be combined and selected in a variety of ways. That is, it is to be understood that various modifications and changes that may be made by those skilled in the art based on the entire disclosure (including claims) and the technological concept are included.

What is claimed is:

1. A warping factor estimation apparatus comprising:
a label information generation unit configured to generate information on voice and non-voice labels, the labels being obtained based on an acoustic feature and a corresponding written text;
a warp model storage unit configured to store a probability model representing voice and non-voice occurrence probabilities, parameters of the probabilities being obtained using the acoustic feature; and
a warp estimation unit configured to receive a cepstrum extracted from digital input speech data, the digital input speech data being obtained on analog-to-digital conversion of an input speech signal,
to read the probability model representing voice and non-voice occurrence probabilities from the warp model storage unit, and
to receive the voice and non-voice labels from the label information generation unit,
the warp estimation unit configured to calculate a warping factor in a frequency axis direction using the probability model representing voice and non-voice occurrence probabilities, the voice and non-voice labels, and the cepstrum to output a resulting warping factor.

2. The warping factor estimation apparatus according to claim 1, wherein the label information generation unit is configured to change the number of voice labels according to a length of voice data.

3. A cepstrum transformation system comprising:
an analysis unit configured to derive a cepstrum from digital input speech data, the digital input speech data being obtained on analog-to-digital conversion of an input speech signal;
a warping factor estimation apparatus configured to calculate a warping factor; and
a transformation unit configured to receive the cepstrum derived by the analysis unit and receives the warping factor output from the warping factor estimation apparatus and that transforms the cepstrum using the warping factor, wherein the warping factor estimation apparatus comprises:
a label information generation unit configured to produce information on voice and non-voice labels, the label obtained based on an acoustic feature and a corresponding written text and made to correspond to the acoustic feature;
a warp model storage unit that stores a probability model representing voice and non-voice occurrence probabilities, parameters of the probabilities being calculated using the acoustic feature; and
a warp estimation unit configured to receive the cepstrum extracted from the analysis unit,
to read the probability model representing voice and non-voice occurrence probabilities from the warp model storage unit, and
to receive the voice and non-voice labels from the label information generation unit,
the warp estimation unit configured to calculate a warping factor in a frequency axis direction using the probability model representing voice and non-voice occurrence probabilities, the voice and non-voice labels, and the cepstrum to output a resulting warping factor.

4. A cepstrum transformation system according to claim 3, wherein the analysis unit is configured to selects a predetermined period of the input speech signal and to perform a predetermined transformation of the predetermined period of the input speech signal to derive the cepstrum for supply to the warp estimation unit and the transformation unit.

5. A speech recognition system comprising:
the cepstrum transformation system according to claim 3;
an acoustic model storage unit configured to store a probability model, the probability model representing an occurrence probability of phonological information on a phoneme basis; and
a speech recognition unit configured to perform a speech recognition using the transformed cepstrum transformed by the cepstrum transformation system, and the probability model, the probability model stored in the acoustic model storage unit, the probability model representing an occurrence probability of phonological information on the phoneme basis.

6. The speech recognition system according to claim 5, wherein the warp model storage unit is configured to store a plurality of probability models therein, each representing voice and non-voice occurrence probabilities, and
the warp estimation unit is configured to calculate a warping factor once for each of the models stored in the warp model storage unit,
the speech recognition system further comprising:
a warping factor determination unit configured to determine a warping factor from the warping factors calculated by the warp estimation unit, and outputs the determined warping factor along with model information corresponding to the warping factor; and
an acoustic model switching unit configured to select an acoustic model, stored in the acoustic model storage unit, based on the model information, and supplies the selected acoustic model to the speech recognition unit, wherein
the transformation unit is configured to perform a cepstrum transformation using the warping factor determined by the warping factor determination unit.

7. A waveform synthesis system comprising:
the cepstrum transformation system according to claim 3; and
a waveform synthesis unit configured to synthesize a waveform using the transformed cepstrum.

8. A speech synthesis system comprising the waveform synthesis system according to claim 7, wherein the waveform synthesis unit is configured to synthesize the waveform of a speech signal.

9. A method using a computer for estimating a warping factor, the method comprising:
generating information on voice and non-voice labels, the label obtained based on an acoustic feature and a corresponding written text; and
receiving a cepstrum extracted from digital input speech data, the digital input speech data being obtained on analog-to-digital conversion of an input speech signal, reading a probability model representing voice and non-voice occurrence probabilities from a warp model storage unit that stores the probability model representing voice and non-voice occurrence probabilities, parameters of the probabilities being obtained using the acoustic feature, and receiving the voice and non-voice labels to calculate a warping factor in a frequency axis direction, using the probability model representing voice and non-voice occurrence probabilities, the voice and non-voice labels, and the cepstrum to output a resulting warping factor.

10. A method using a computer for performing cepstrum transformation, the method comprising:
deriving a cepstrum from input digital input speech data, the input digital input speech data being obtained on analog-to-digital conversion of an input speech signal; and
transforming the cepstrum derived, using a warping factor calculated and output by the method according to claim 9.

11. The method according to claim 10, further comprising:
selecting a predetermined period of the input speech signal and performing a predetermined transformation to derive the cepstrum for use of the warping factor calculation and transformation.

12. A method using a computer for performing speech recognition, the method comprising
performing speech recognition using the cepstrum, transformed by the method according to claim 10, and a probability model representing occurrence probabilities of phonological information.

13. The method according to claim 12, wherein a plurality of the probability models, each representing voice and non-voice occurrence probabilities are stored in a storage unit, the method further comprising:
calculating a warping factor once for each of the models;
determining a warping factor from a plurality of warping factors and selecting model information corresponding to the warping factor;
performing a cepstrum transformation using the determined warping factor; and
selecting an acoustic model based on the selected model information and supplying the selected acoustic model for use in speech recognition.

14. A method using a computer for performing waveform synthesis, the method comprising
synthesizing a waveform using the cepstrum transformed by the method according to claim 10.

15. A non-transitory computer-readable recording medium storing a warping factor estimation program, wherein a probability model representing voice and non-voice occurrence probabilities is stored in a storage unit, the program causing a computer to execute:
a process that generates information on voice and non-voice labels, the label obtained based on an acoustic feature and a corresponding written text; and
a process that receives a cepstrum extracted from digital input speech data, the digital input speech data being obtained on analog-to-digital conversion of an input speech signal,
reads the probability model representing voice and non-voice occurrence probabilities from the storage unit, a parameters of the probabilities being obtained using the acoustic feature, and
receives the voice and non-voice labels to calculate a warping factor in a frequency axis direction using the probability model representing voice and non-voice occurrence probabilities, the voice and non-voice labels, and the cepstrum to output a resulting warping factor.

16. The non-transitory computer-readable recording medium storing a cepstrum transformation program causing a computer to execute a process that transforms a cepstrum using a warping factor calculated by the warping factor estimation program according to claim 15.

17. The non-transitory computer-readable recording medium storing the cepstrum transformation program according to claim 16, further causing a computer to transform a cepstrum, using the warping factor, the cepstrum being calculated by the analysis process in which a predetermined period of an input speech signal is selected and predetermined transformation is performed to derive the cepstrum for supply to the warping factor calculation process and to the cepstrum transformation process.

18. The non-transitory computer-readable recording medium storing a speech recognition program causing a computer to execute speech recognition, using the cepstrum, transformed by the cepstrum transformation program according to claim 16, and a probability model representing occurrence probabilities of phonological information.

19. The non-transitory computer-readable recording medium storing the speech recognition program according to claim 18, wherein a plurality of the probability models, each representing voice and non-voice occurrence probabilities, are stored in a storage unit, the program further causing a computer to execute:
a process that calculates a warping factor once for each of the models;
a process that determines a warping factor from a plurality of warping factors and selecting model information corresponding to the warping factor;
a process that performs a cepstrum transformation using the determined warping factor; and
a process that selects an acoustic model based on the selected model information and supplying the selected acoustic model for use in speech recognition.

20. The non-transitory computer-readable recording medium storing a waveform synthesis program causing a computer to synthesize waveforms, using the cepstrum transformed by the cepstrum transformation program according to claim 16.

* * * * *